A. S. HUGHES.
DISPLAY RACK.
APPLICATION FILED MAR. 15, 1909.
953,205.
Patented Mar. 29, 1910.
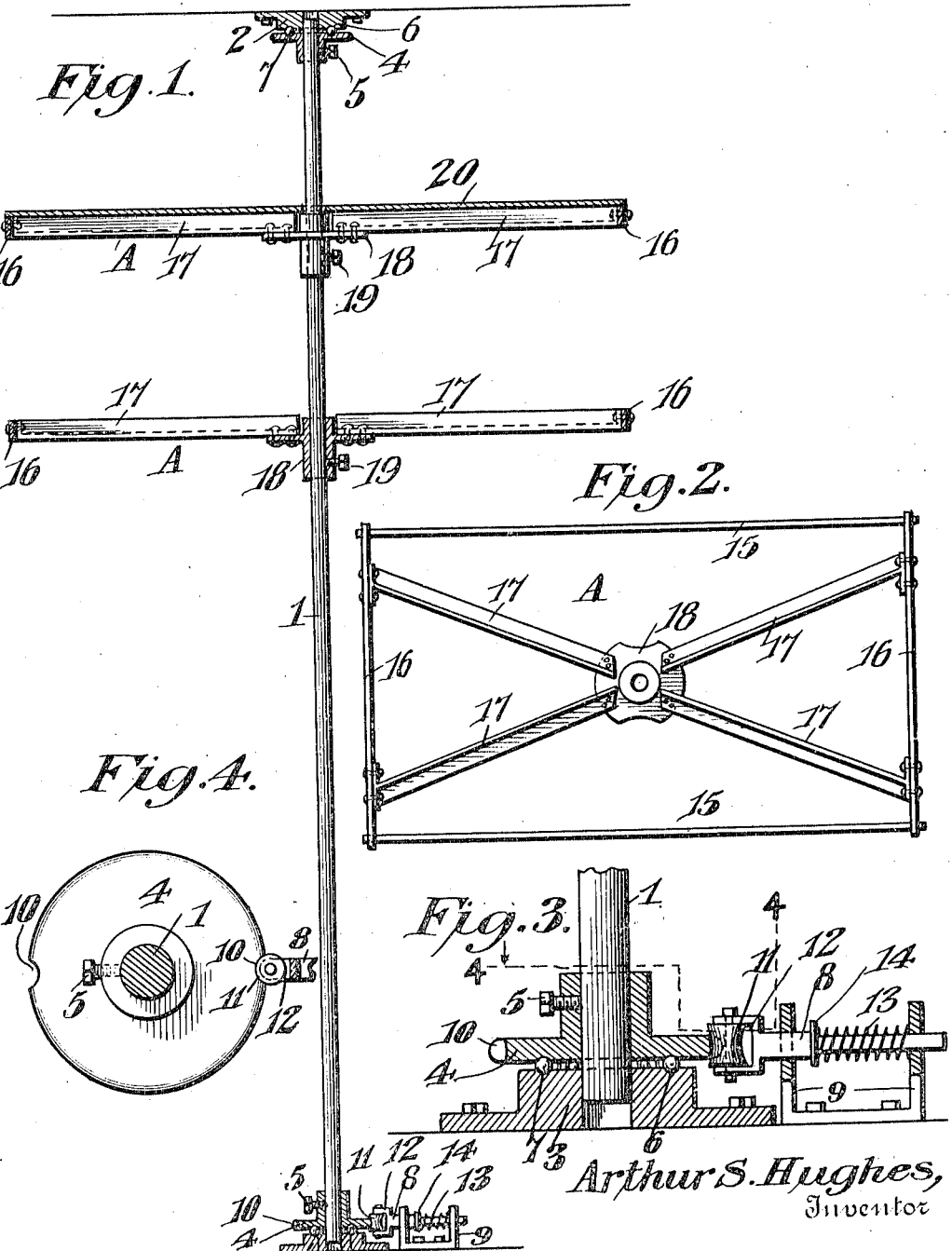
Arthur S. Hughes,
Inventor

UNITED STATES PATENT OFFICE.

ARTHUR SHERIDAN HUGHES, OF MANSFIELD, OHIO.

DISPLAY-RACK.

953,205.  Specification of Letters Patent.  Patented Mar. 29, 1910.

Application filed March 15, 1909. Serial No. 483,460.

*To all whom it may concern:*

Be it known that I, ARTHUR S. HUGHES, a citizen of the United States, residing at Mansfield, in the county of Richland and State of Ohio, have invented a new and useful Display-Rack, of which the following is a specification.

This invention relates to a display rack intended for use in stores whereby suits, goods, merchandise and the like, can be effectively displayed in a manner to be conveniently accessible.

The invention has for its principal objects to provide a device of this character which is of simple and durable construction, composed of comparatively few parts, and so designed as to be readily adjusted or converted for different uses, there being a locking means for yieldingly holding the device so that the racks thereof can be swung around to display the goods at the back as well as at the front of the device, and at the same time render all the goods conveniently accessible.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a central vertical section of the display apparatus. Fig. 2 is a plan view of one of the racks adapted for suspending suits or the like. Fig. 3 is an enlarged sectional view of the locking means for the shaft of the apparatus. Fig. 4 is an enlarged sectional view on line 4—4, Fig. 3.

Similar reference characters are employed to designate corresponding parts throughout the views.

Referring to the drawing, 1 designates a vertically-disposed rotatable shaft which has its upper and lower ends mounted respectively in ceiling and floor bearings 2 and 3, the extreme ends of the shaft being arranged to extend a short distance only in said bearings. On the extremities of the shaft are bearing disks 4 fastened by binding screws 5. Each disk is disposed opposite the adjacent bearing, and the opposed faces of the latter and disk are formed with grooves 6 for receiving anti-friction balls 7 for affording free turning of the shaft. The lower disk 4 thereby holds the said shaft in the above described position, and the anti-friction balls, which are arranged between the said disk and its adjacent bearing, minimize the amount of friction which would otherwise be considerable, and thereby permit a person to readily revolve the vertical shaft and its normally heavy load of display goods. The shaft, however, is adapted to be yieldingly locked in different positions by means of a bolt 8 mounted in a bearing bracket 9 secured to the floor adjacent the bearing 3, the bolt being arranged to slide back and forth in the same plane with the disk 4, the latter having notches 10 in its periphery, any one of which is adapted to engage a concave roller 11 supported between the bifurcations 12 of the bolt. The bolt is pressed inwardly toward the disk by a helical compression spring 13 having one end bearing against the outer upstanding member of the bearing bracket 9, while the other end bears against a shoulder 14 on the bolt. The notches are so shaped that the roller will readily ride out of the same by applying a slight torque to the shaft 1, when it is desired to turn the same for exhibiting goods at all points of the display apparatus. It will thus be seen that the locking means acts also as a brake, should an excessive force be applied to the shaft for turning it.

One or more racks A may be applied to the shaft 1 in superimposed position for displaying the goods. When the device is intended to be used for displaying suits of clothes, the rack will be constructed as shown in Fig. 2. This rack is of rectangular form having side rods 15 connected with end bars 16. Secured to the end bars are approximately diagonal members 17 attached to a hub 18 through which the shaft 1 extends, the hub being provided with a clamping screw 19, as shown in Fig. 1, for securing the rack in any position of vertical adjustment thereon. The rods 15 are adapted to receive the suit hangers so that there will be two rows of suits disposed at opposite sides of the shaft. If small articles are desired to be exhibited, the rack may be provided with a plate 20 resting on the top of the same, as shown by the upper rack of Fig. 1.

A display device of this character is extremely useful in department stores or the like and goods and wares can be artistically arranged thereon for displaying the same to the customers. Obviously, any number of racks may be provided, although when the apparatus is intended for displaying suits, merely one rack of the character shown in Fig. 2, will be employed. When it is desired to show the goods on the back portions of the racks, it is merely necessary to turn the shaft, and as soon as the same has made half a revolution, it may be automatically stopped by the locking device, as previously explained.

Whenever it is desired to change the racks in any manner, it is only necessary to release the binding screws 5 of each disk, and the shaft will immediately drop to the floor. The upper end of said shaft can then be readily removed from its bearings 2 and 3, and the racks removed from, or more racks added to, the said shaft as desired.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. In a display apparatus, the combination of a supporting shaft, a bearing in which one extremity of the shaft is mounted, a disk secured to the shaft and disposed immediately adjacent the bearing and of such diameter as to project at its periphery beyond the bearing, the periphery of the disk having notches, anti-friction devices between the disk and bearing, with a locking device including a movable spring-pressed member, and a roller pivoted on the member with its axis parallel with that of the shaft and having a concave circumference to engage in any notch of the disk to hold the shaft yieldingly in different positions.

2. In a display apparatus, the combination of an upright rack-supporting shaft, socketed ceiling and floor bearings into which the extremities of the shaft extend, a disk removably connected with the lower portion of the shaft and coöperating with the floor bearing to support the shaft, said disk being rotatable with the shaft and having notches in its periphery, a spring-pressed element disposed outwardly from and in radial relation to the disk, a support in which the element is slidably mounted, and a device on the element arranged to ride on the periphery of the disk and seat in any notch thereof to yieldingly hold the shaft against rotation.

In testimony, that I claim the foregoing as my own, I have hereto affixed my signature in the presence of two witnesses.

ARTHUR SHERIDAN HUGHES.

Witnesses:
   HAZEL RUSSELL,
   S. G. GLASENER.